UNITED STATES PATENT OFFICE.

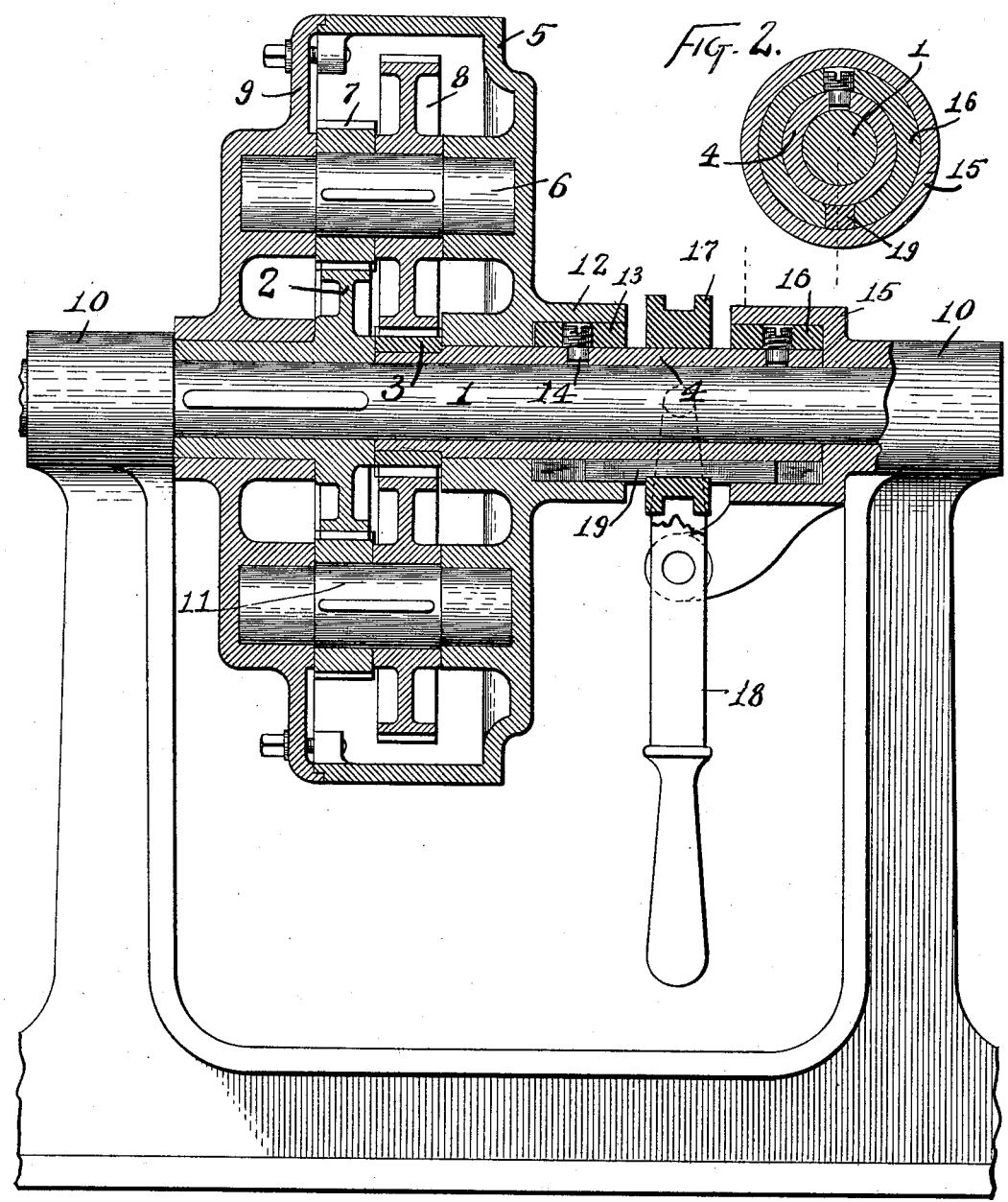

WINFIELD S. ROGERS, OF CINCINNATI, OHIO.

PLANETARY GEARING.

SPECIFICATION forming part of Letters Patent No. 588,356, dated August 17, 1897.

Application filed March 8, 1897. Serial No. 626,480. (No model.)

*To all whom it may concern:*

Be it known that I, WINFIELD S. ROGERS, of Cincinnati, Hamilton county, Ohio, have invented certain new and useful Improvements in Planetary Gearing, of which the following is a specification.

Where it is desired to transmit motion to a shaft from a wheel mounted upon it at two selective relative speeds, or to transmit similar motion from such shaft to said wheel, planetary gearing is often interposed in the transmission system between the shaft and wheel to serve in effecting any desired changes in relative rates of turning. My invention relates to improvements in such devices; and its object is to improve the smoothness and steadiness and accuracy with which the motion is transmitted and to enhance the durability of the mechanism.

My invention will be readily understood from the following description, taken in connection with the accompanying drawings, in which—

Figure 1 is a vertical diametrical section of a planetary-gear system exemplifying my invention, and Fig. 2 a vertical transverse section of one of the clutches.

In the drawings, 1 indicates the shaft; 2, a gear mounted fast thereon and hereinafter termed the "fixed gear;" 3, a gear mounted loosely on the shaft alongside the fixed gear and of a size differing therefrom, and hereinafter termed the "loose gear;" 4, the hub of the loose gear, projecting outwardly away from both the mentioned gears for a considerable distance, this hub, which is virtually a part of the loose gear, being of course loose upon the shaft; 5, the main wheel, shown as a pulley mounted loosely on the shaft alongside the pair of mentioned gears by having its hub fitted to run loosely upon hub 4 of the loose gear; 6, the planetary axle, mounted in the main wheel parallel with shaft 1; 7, a planet-gear mounted on axle 6 and engaging fixed gear 2; 8, a second planet-gear fast with planet-gear 7 and engaging loose gear 3; 9, a removable face-plate or head for the main wheel, whereby the main wheel is given the form of a casing inclosing all the gears; 10, the bearings for shaft 1; 11, a duplication of the planet-axle and planet-gears mounted in the main wheel opposite the corresponding parts previously referred to, the object of this duplication being to secure a balance of weight and strains in working, as is usual in planetary gearing; 12, the outwardly-projecting hub of the main wheel; 13, a gapped clutch-ring seated in a counterbore in said hub and snugly encircling hub 4; 14, a pin or screw uniting clutch-ring 13 to hub 4 at a point diametrically opposite the gap therein, this pin or screw preventing the rotation of the clutch-ring with reference to hub 4; 15, a counterbored hub surrounding the outer end of hub 4 and rigidly supported against rotation, (being rigidly connected with one of bearings 10,) this hub 15 presenting its counterbore opposite to that in hub 12; 16, a clutch-ring seated in the counterbore of hub 15, this clutch-ring being similar to the one previously referred to and being similarly united to hub 4 by a pin or screw; 17, a shifting collar adapted to slide on hub 4 between the two clutch-rings; 18, a lever for shifting collar 17 toward either clutch-ring alternatively, and 19 a double-ended wedge carried by collar 17, its ends engaging the gaps in the clutch-rings, so that if the collar be slid in one direction the wedge will expand one of the clutch-rings and if it be slid in the other direction it will expand the other clutch-ring.

The construction and operation of the clutches is substantially as set forth in patent No. 378,448, granted to Willis C. Jones and myself February 28, 1888.

Assume that both clutches are disengaged and that main wheel 5 is in rotary motion and that there is resistance to the turning of shaft 1. Under these conditions the main wheel will not transmit motion to the shaft, fixed gear 2 will remain stationary with the shaft, the planet-gears will revolve in their planetary path and will rotate on their axes, and loose gear 3 and hub 4 will rotate at speed in excess of that of the main wheel in accordance with the law of planetary gearing as affected by the proportion of the gearing. If now collar 17 be shifted to the right, then clutch-ring 16 will be expanded and will frictionally lock with hub 15, thus locking hub 4 and loose gear 3 against rotation. Under these circumstances the rotation of the main wheel will impose rotary motion upon fixed gear 2 and on shaft 1 at a rate of speed relative to that of the main wheel, as determined by the proportion of the gears and the laws of planetary gearing. If now, on the other hand, collar 17 be shifted to the left, then clutch-ring 13 will be expanded into friction engagement with hub 12 and hub 4 will thereby become locked with the main wheel, whereupon all of the rotary parts will turn together as one body, the planet-gears not turning on their axes, but acting simply as transmitting-drivers fixed in the main wheel.

In any use of the device the motion transmitted is satisfactorily smooth and regular and accurate and free from the defects in behavior which are found in practice to exist in similar devices not provided with my improvement. While the main wheel has been considered as the driver from which motion was to be transmitted to the shaft, it is obvious that the shaft may be the driver for transmitting motion to the main wheel, and it is equally obvious that the main wheel may be a belt-pulley or a gear-wheel and that motion may be taken to or from the shaft by any desired mechanism of transmission.

I claim as my invention—

1. A shaft fitted for rotation, a main wheel mounted upon and arranged for free rotation with reference to said shaft, a planet-axle carried directly by said main wheel parallel with said shaft, a pair of united planet-wheels on said planet-axle, a gear fixed on said shaft and gearing with one of said planet-gears, a gear loose on said shaft and loose relative to said main wheel and engaging the other of said planet-gears, and two clutches adapted alternatively to lock said loose gear to said main wheel and to lock said loose gear against rotation, combined and arranged for operation substantially as set forth.

2. A shaft fitted for rotation, a main wheel mounted upon and arranged for free rotation with reference to said shaft, a planet-axle carried directly by said main wheel parallel with said shaft, a pair of united planet-wheels on said planet-axle, a gear fixed on said shaft and gearing with one of said planet-gears, a gear loose on said shaft and loose relative to said main wheel and engaging the other of said planet-gears, a clutch having fixed connection with said loose gear and adapted to be engaged with said main wheel, a second clutch having fixed relation with said loose gear and adapted to be engaged with a clutch element fixed against rotation, and devices for producing the alternative engagement of said clutches, combined and arranged for operation substantially as set forth.

3. A shaft fitted for rotation, a gear fast thereon, a gear loose thereon and having an extended hub, a friction-clutch carried by said extended hub, a clutch element fixed against rotation and adapted to be frictionally engaged by said friction-clutch, a main wheel mounted for rotation on said hub independent of said loose gear, planet-gears carried directly by said main wheel and engaging the before-mentioned gears, a second friction-clutch carried by said extended hub and adapted for frictional engagement with a clutch element carried by said main wheel, and devices for alternatively engaging said clutches to lock said loose gear to the main wheel or to said fixed clutch element.

WINFIELD S. ROGERS.

Witnesses:
CHARLES A. MINTEN,
GEO. S. ARMSTRONG.